US012162355B2

United States Patent
Kim

(10) Patent No.: US 12,162,355 B2
(45) Date of Patent: Dec. 10, 2024

(54) INSTRUMENT CLUSTER

(71) Applicant: HYUNDAI MOBIS Co., Ltd., Seoul (KR)

(72) Inventor: Byung Ki Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 897 days.

(21) Appl. No.: 17/126,432

(22) Filed: Dec. 18, 2020

(65) Prior Publication Data
US 2021/0188089 A1 Jun. 24, 2021

(30) Foreign Application Priority Data

Dec. 20, 2019 (KR) .......................... 10-2019-0172515
Dec. 20, 2019 (KR) .......................... 10-2019-0172517

(51) Int. Cl.
*B60K 35/60* (2024.01)
*B60K 35/50* (2024.01)

(52) U.S. Cl.
CPC .............. *B60K 35/60* (2024.01); *B60K 35/50* (2024.01); *B60K 2360/693* (2024.01)

(58) Field of Classification Search
CPC .. B60K 37/02; B60K 37/04; B60K 2370/157; B60K 2370/693; B60R 2011/0005; B60R 2011/0042; H04R 5/02; H04R 2499/13; H04R 2499/15; H04R 17/00; H04R 2440/05; H04R 1/026
USPC ........ 296/70; 180/90; 362/487; 381/86, 150, 381/163, 185, 306, 337, 354
See application file for complete search history.

(56) References Cited

FOREIGN PATENT DOCUMENTS

| JP | 60-153295 | 1/1984 | |
|----|-----------|--------|---|
| JP | H0220200 B2 * | 5/1990 | |
| JP | 10-260065 | 9/1998 | |
| JP | 2005-020462 | 1/2005 | |
| JP | 2005020462 A * | 1/2005 | |
| JP | 2005-306167 | 11/2005 | |
| JP | 2005306167 A * | 11/2005 | |
| JP | 2010-145182 | 7/2010 | |
| JP | 4678552 B2 * | 4/2011 | ............. B60K 37/02 |
| JP | 2012-205082 | 10/2012 | |
| KR | 1999-0042085 | 12/1999 | |

(Continued)

OTHER PUBLICATIONS

Kadoya et al., "Display device for use in a vehicle", Published: Apr. 27, 2011, Publisher: Japanese Patent Office, Edition: JP4678552B2 (Year: 2011).*

(Continued)

*Primary Examiner* — Jason S Daniels
(74) *Attorney, Agent, or Firm* — NSIP Law

(57) ABSTRACT

A vehicle instrument cluster having a vibration speaker structure including a frame accommodating a component configured to display vehicle operation information therein and having an open front surface, a cover glass including an outer glass having a hollow shape surrounding an outer edge of the front surface of the frame and an inner glass surrounding a center of the front surface of the frame and positioned to be spaced apart from the outer glass, an exciter disposed on a rear surface of the inner glass and configured to vibrate the inner glass, and a suspension disposed between and connected to the outer glass and the inner glass spaced apart from each other.

10 Claims, 23 Drawing Sheets

(56) References Cited

FOREIGN PATENT DOCUMENTS

KR 2008-0102863 11/2008

OTHER PUBLICATIONS

Nishikawa, "Alarming Device for Vehicle", Published: Nov. 4, 2005, Published: Japanese Patent Office, Edition: JP2005306167A (Year: 2005).*
Hara, "Speaker Device", Published: Jan. 20, 2005, Publisher: Japanese Patent Office, Edition: JP2005020462A (Year: 2005).*
Tomiji et al. "Attachment of Speaker", Published: Apr. 8, 1990, Publisher: Japanese Patent Office, Edition: JPH0220200B2 (Year: 1990).*
Office Action dated Dec. 12, 2023, in Korean Patent Application No. 2019-0172515.

* cited by examiner

FORWARD DIRECTION ←——→ REARWARD DIRECTION

FORWARD DIRECTION ←——→ REARWARD DIRECTION

FORWARD DIRECTION ←→ REARWARD DIRECTION

FORWARD DIRECTION ←→ REARWARD DIRECTION

FORWARD DIRECTION ←——→ REARWARD DIRECTION

FORWARD DIRECTION ←——→ REARWARD DIRECTION

REARWARD DIRECTION
FORWARD DIRECTION

FORWARD DIRECTION ←→ REARWARD DIRECTION

FORWARD DIRECTION ←⎯⎯→ REARWARD DIRECTION

INSTRUMENT CLUSTER

CROSS-REFERENCE TO RELATED APPLICATION

This application claims priority from and the benefit of Korean Patent Application No. 10-2019-0172515, filed on Dec. 20, 2019, and Korean Patent Application No. 10-2019-0172517, filed on Dec. 20, 2019, which are hereby incorporated by reference for all purposes as if fully set forth herein.

BACKGROUND

Field

Exemplary embodiments of the invention relate generally to a vehicle instrument cluster and, more specifically, to an instrument cluster allowing a drive to receive a danger alert or danger information of a vehicle through a sound and an image.

Discussion of the Background

Recently, the automobile market is rapidly growing with a trend of favoring intelligent vehicles having advanced information technology (IT) and convenient functions in addition to improving the original functions of vehicles.

In this trend, electronization of vehicles is proliferating, and functions in which IT and wireless communication technology are combined are rapidly increasing. Particularly, products for supporting the stability and convenience of drivers are being released, and one of the products is an instrument cluster which is an instrument panel.

An instrument cluster displays a vehicle speed, revolutions per minute (RPM), a temperature of cooling water, an amount of fuel, and the like to allow the driver to visually recognize information thereof.

Generally, the instrument cluster provides the information with a real image in front of the driver.

In this case, in the conventional instrument cluster, a direction of visual display information is different from an oriented direction of a speaker sound.

That is, in the conventional instrument cluster, since a speaker is installed on a rear surface of the vehicle to be separated from a conventional sound system, directions of an image and a sound (warning sound and the like) that the driver sees and hears are different.

Accordingly, since sound image localization is not implemented, there is a high possibility that the driver feels it is difficult to recognize a certain situation due to confusion caused by a directional difference between visual information and the speaker sound.

The above information disclosed in this Background section is only for enhancement of understanding of the background of the invention and, therefore, it may contain information that does not constitute prior art.

SUMMARY

Exemplary embodiments of the present invention provide a vehicle instrument cluster having a vibration speaker structure in which a sound image is displayed in a center of a screen through an inner glass serving as a speaker diaphragm and a sound field is formed in the entire screen to help a driver with improved situation recognition.

Additional features of the invention will be set forth in the description which follows, and in part will be apparent from the description, or may be learned by practice of the invention.

An exemplary embodiment of the invention provides a vehicle instrument cluster having a vibration speaker structure-, the vehicle instrument cluster including a frame accommodating a component configured to display vehicle operation information therein and having an open front surface, a cover glass including an outer glass having a hollow shape surrounding an outer edge of the front surface of the frame and an inner glass surrounding a center of the front surface of the frame and positioned to be spaced apart from the outer glass, an exciter disposed on a rear surface of the inner glass and configured to vibrate the inner glass, and a suspension disposed between and connected to the outer glass and the inner glass spaced apart from each other.

The suspension may have a corrugated shape to be disposed between and connected to an inner circumferential surface of the outer glass and an outer circumferential surface of the inner glass.

The suspension may be disposed between and detachably connected to an inner circumferential surface of the outer glass and an outer circumferential surface of the inner glass.

The suspension may maintain a front-rear movement of the inner glass vibrated by the exciter and block vibration energy of the inner glass from being transferred to the outer glass.

The exciter may be disposed on each of both ends of the rear surface of the inner glass.

The exciter may be coupled to the inner glass through a snap-fit coupling method.

The exciter may include a housing accommodating a voice coil and a magnet therein, a plurality of brackets formed on an outer circumferential surface of the housing, and coupling hooks formed to be bent and extend in a forward direction of the brackets and press-fitted to the rear surface of the inner glass.

A plurality of coupling protrusions formed to protrude and be engaged with and press-fitted to the coupling hooks may be formed on the rear surface of the inner glass.

The coupling protrusion may include a seating surface in contact with the bracket, and a coupling rod protruding from the seating surface in a rearward direction.

The plurality of brackets may be formed at equidistant intervals along the outer circumferential surface of the housing, and a coupling hole through which the coupling rod passes through may be formed in at least one of the brackets.

Another exemplary embodiment of the invention provides a vehicle instrument cluster having a vibration speaker structure, the vehicle instrument cluster including a frame having an accommodation space therein and an open front surface, a cover glass including an outer glass having a hollow shape surrounding an outer edge of the front surface of the frame and an inner glass surrounding a center of the front surface of the frame and positioned to be spaced apart from the outer glass, an exciter disposed on a rear surface of the inner glass and configured to vibrate the inner glass in a front-rear direction, and a holder disposed in the frame and supporting the exciter.

The inner glass may not come into contact with the outer glass when the inner glass is vibrated by the exciter.

There may be a step difference between the inner glass and the outer glass in the front-rear direction.

The outer glass may be formed in a shape in which an end portion of an inner circumferential surface thereof is bent in a rearward direction.

The exciter may be disposed on each of at least three points on the rear surface of the inner glass.

Another exemplary embodiment of the invention provides a vehicle instrument cluster having a vibration speaker structure, the vehicle instrument cluster including a frame having an accommodation space therein and an open front surface, a cover glass including an outer glass having a hollow shape surrounding an outer edge of the front surface of the frame and an inner glass surrounding a center of the front surface of the frame and positioned to be spaced apart from the outer glass, and an exciter disposed on a rear surface of the inner glass and configured to vibrate the inner glass in a front-rear direction.

In this case, the vehicle instrument cluster having a vibration speaker structure may further include a holder disposed at a center of an inner portion of the frame and supporting the inner glass.

The inner glass may be formed to have a structure detachable from the holder.

The holder may surround a display included in a central portion of the frame, and a portion, which is in contact with the inner glass, of the holder may be formed in a curved surface shape.

The exciter may be provided as a plurality of exciters disposed on both ends of the rear surface of the inner glass.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
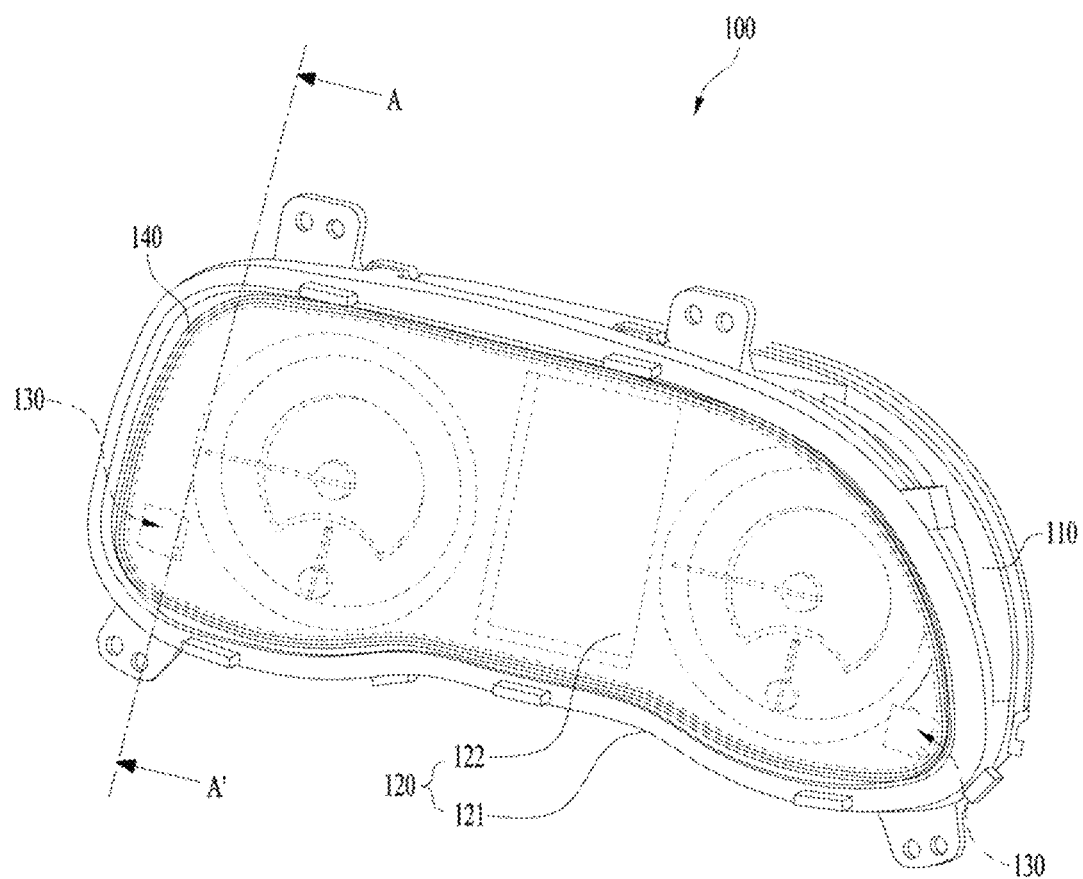
FIG. 1 is a perspective view illustrating a vehicle instrument cluster according to a first embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

The scope of the present invention is defined by the appended claims. Meanwhile, the terms used herein are provided only to describe the embodiments of the present invention and not for purposes of limitation. In the present specification, unless the context clearly indicates otherwise, the singular forms include the plural forms. It will be understood that the term "comprise" or "comprising," when used herein, specifies some stated components, steps, operations and/or elements but do not preclude the presence or addition of one or more other components, steps, operations and/or elements.

A vehicle instrument cluster having a vibration speaker structure of the present invention allows directions of image information and a sound relating to vehicle operation to be the same so that an optimum environment in which a driver can recognize a situation is provided.

As a method thereof, in the present invention, exciters are basically mounted on a cover glass, and the cover glass is used as a speaker diaphragm.

In this case, in order to use the cover glass as the speaker diaphragm, an installation structure is required in which vibration of the cover glass is preserved rather than the cover glass being fixed to a connecting portion.

That is, when the exciter is mounted on the cover glass in a state in which the connecting portion is fixed to the cover glass, vibration of the cover glass configured to vibrate due to the exciter is attenuated by the connecting portion.

Accordingly, due to lack of air vibration causing sound generation, there is a problem in the performance of the speaker as a result of the lack. To this end, the vehicle instrument cluster of the present invention proposes a structure in which a divided cover glass is used as a speaker diaphragm through first to third embodiments which will be described below.

In addition, since the present invention will be described from a structural viewpoint in which the cover glass may function as a speaker diaphragm, a description about a functional mechanism of a speaker will be omitted or only some of the description will be described.

First Embodiment (Suspension Structure Connecting Divided Cover Glass)

Figure 2:
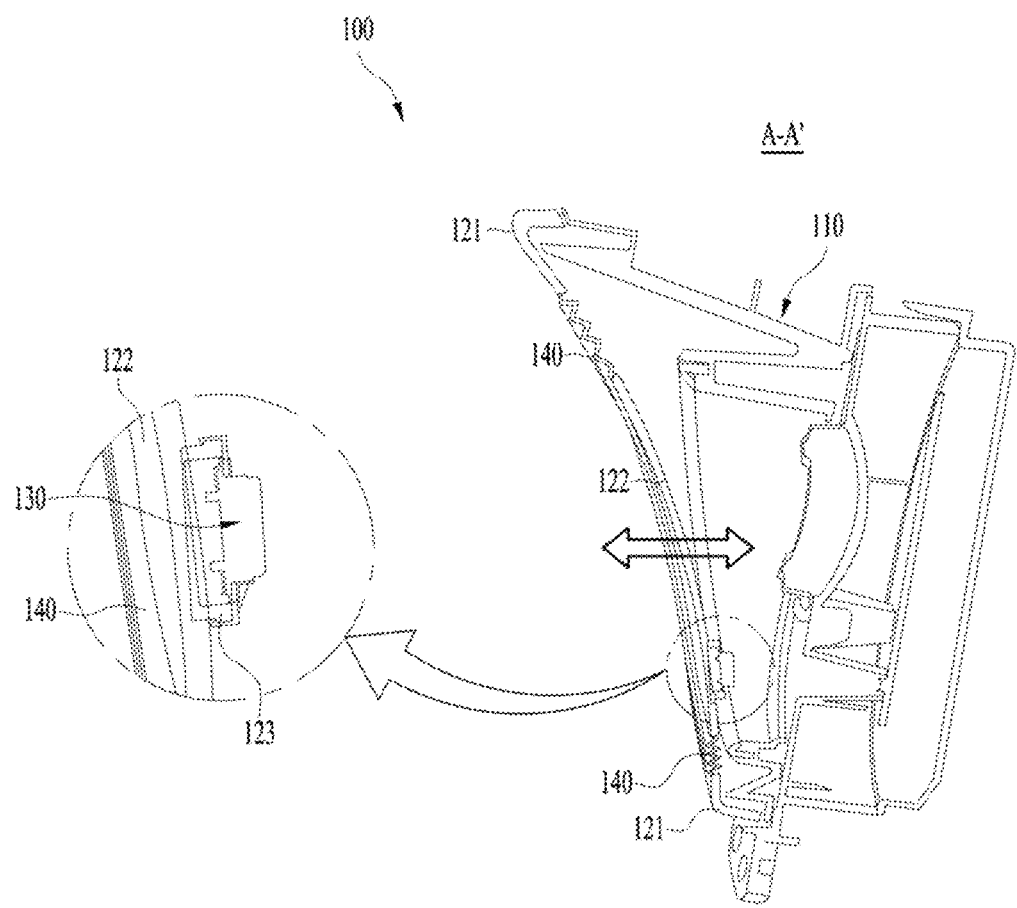
FIG. 2 is a cross-sectional view taken along line A-A' illustrated in FIG. 1.

FIG. 1 is a perspective view illustrating a vehicle instrument cluster according to a first embodiment of the present invention, and FIG. 2 is a cross-sectional view taken along line A-A' illustrated in FIG. 1.

Referring to FIGS. 1 and 2, a vehicle instrument cluster 100 includes a frame 110, a cover glass 120, exciters 130, and a suspension 140.

The frame 110 is a frame that accommodates components configured to display vehicle operation information therein and has an open front surface. In this case, the vehicle operation information may refer to information in which a vehicle speed, revolutions per minute (RPM), a temperature of cooling water, an amount of fuel, and the like are displayed.

The cover glass 120 includes an outer glass 121 and an inner glass 122. Basically, the cover glass 120 has a form surrounding the front surface of the frame 110 and performs a speaker diaphragm function.

The outer glass 121 surrounds an outer edge of the front surface of the frame 110 and is formed in a hollow shape. In this case, the outer glass 121 is detachably connected to the outer edge of the front surface of the frame 110.

The inner glass 122 surrounds a center of the front surface of the frame 110. The inner glass 122 is positioned to be spaced apart from the outer glass 121. That is, the inner glass 122 and the outer glass 121 are separated from each other.

The exciter 130 is an apparatus configured to supply an excitation current and is also referred to as an exciter. The exciter 130 vibrates the inner glass 122 using a signal current flowing in a voice coil.

To this end, the exciter 130 is disposed on a rear surface of the inner glass 122 and vibrates the inner glass 122 in a front-rear direction.

In this case, the exciters 130 are disposed both ends of the rear surface of the inner glass 122 so that the inner glass 122 has a stereo effect as a speaker diaphragm.

The suspension 140 is disposed between and connected to the outer glass 121 and the inner glass 122 spaced apart from each other.

That is, the suspension 140 has a corrugated shape to be disposed between and connected to an inner circumferential surface of the outer glass 121 and an outer circumferential surface of the inner glass 122.

In this case, the suspension 140 maintains a front-rear movement of the inner glass 122 vibrated by the exciter 130 and blocks vibration energy of the inner glass 122 from being transferred to the outer glass 121.

The suspension 140 may be disposed between and detachably connected to the inner circumferential surface of the outer glass 121 and the outer circumferential surface of the inner glass 122.

Figure 3:
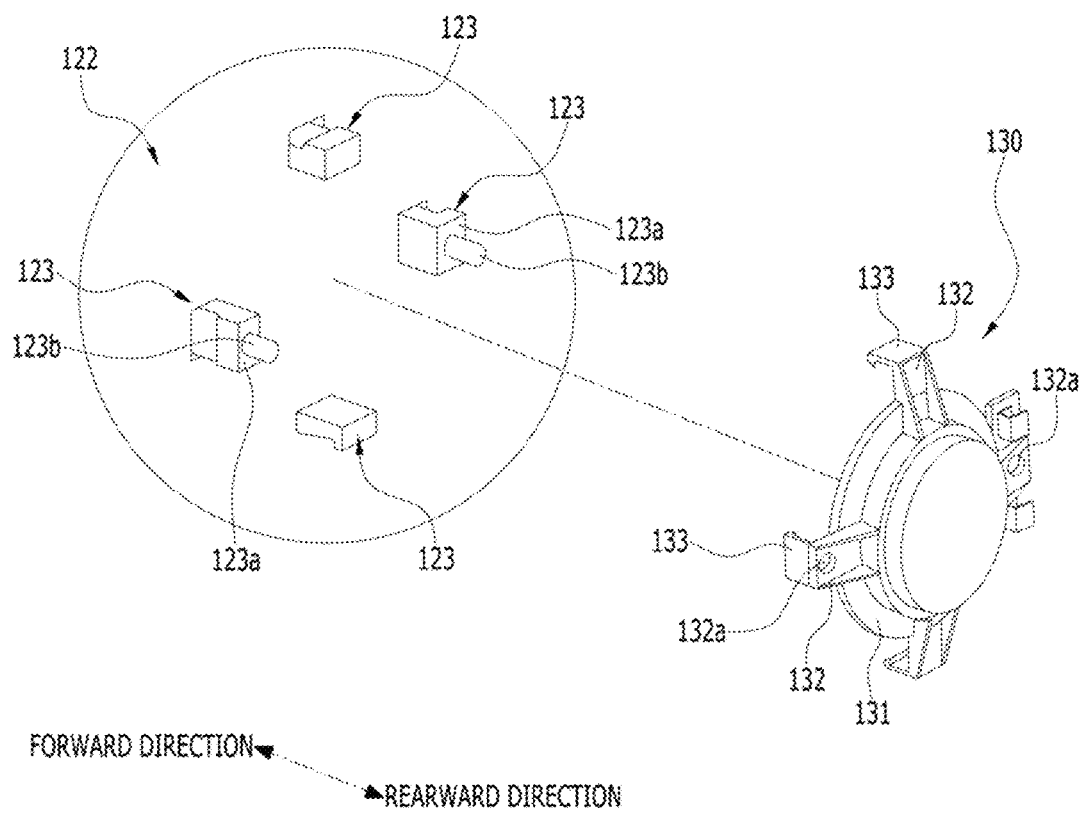
FIG. 3 is a view illustrating a coupling relationship between an exciter and an inner glass of the vehicle instrument cluster according to the embodiment of the present invention.

FIG. 3 is a view illustrating a coupling relationship between the exciter and the inner glass of the vehicle instrument cluster according to the embodiment of the present invention.

Referring to FIG. 3, the exciter 130 is coupled to the inner glass 122 through a snap-fit coupling method. That is, the exciter 130 and the inner glass 122 are detachably press-fitted to each other.

The exciter 130 includes a housing 131, brackets 132, and coupling hooks 133.

The housing 131 accommodates the voice coil and a magnet therein.

The plurality of brackets 132 are formed on an outer circumferential surface of the housing 131. In this case, the plurality of brackets 132 are formed at equidistant intervals along the outer circumferential surface of the housing 131. In addition, one or more coupling holes 132a are formed in the plurality of brackets 132.

In this case, it is more appropriate that the plurality of coupling holes 132a are not formed in the bracket 132, but the plurality of coupling holes 132a may or may not be formed in the bracket 132 according to a position of the bracket 132.

The coupling hook 133 is formed to be bent and extend in a forward direction of the bracket 132. The coupling hook 133 is press-fitted to the rear surface of the inner glass 122.

In this case, a plurality of coupling protrusions 123 engaged with and press-fitted to the coupling hooks 133 are formed on the rear surface of the inner glass 122.

The coupling protrusions 123 include seating surfaces 123a and coupling rods 123b.

The seating surface 123a is in surface contact with the bracket 132.

The coupling rod 123b is formed to protrude in a rearward direction from the seating surface 123a. The coupling rod 123b passes through the coupling hole 132a of the exciter 130.

Second Embodiment (Holder Structure Supporting Exciter Connected to Inner Glass)

Figure 4:
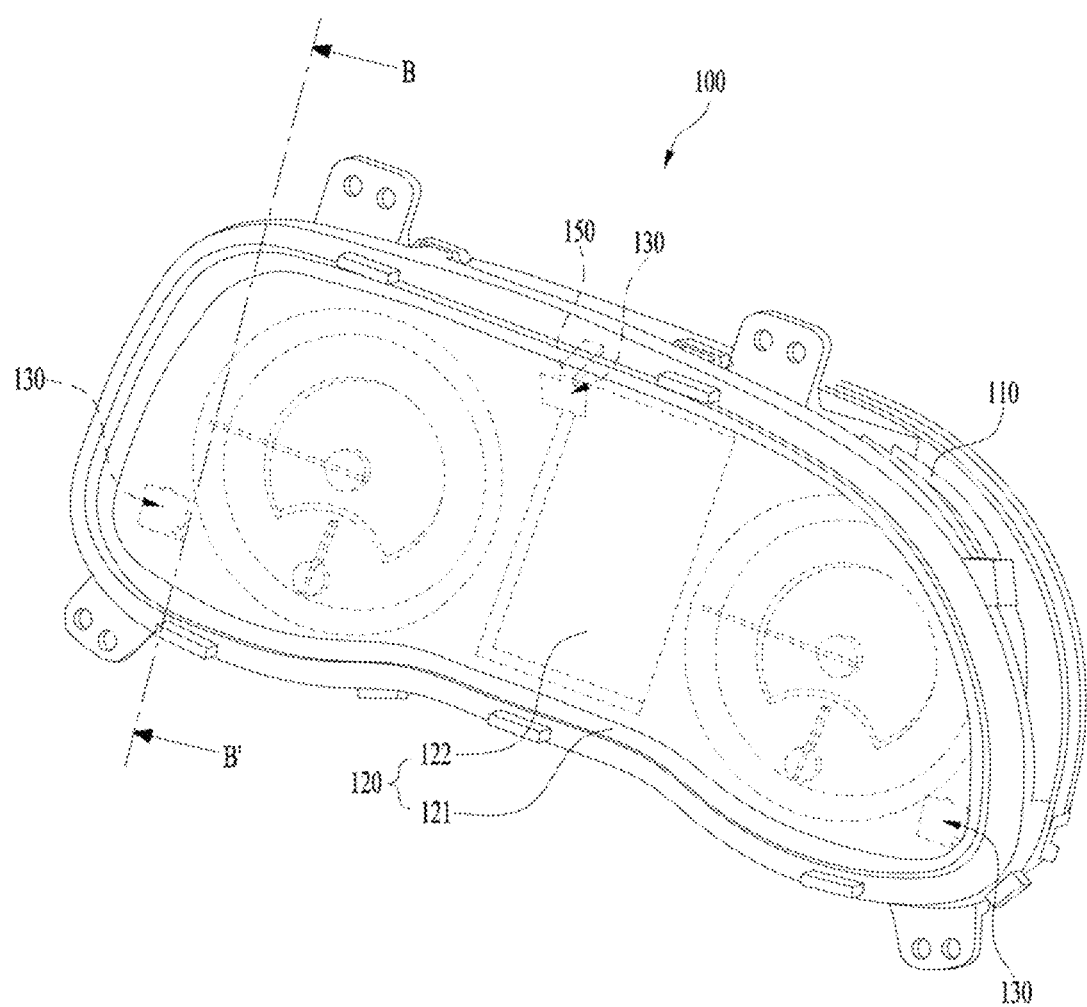
FIG. 4 is a perspective view illustrating a vehicle instrument cluster according to a second embodiment of the present invention.
Figure 5:
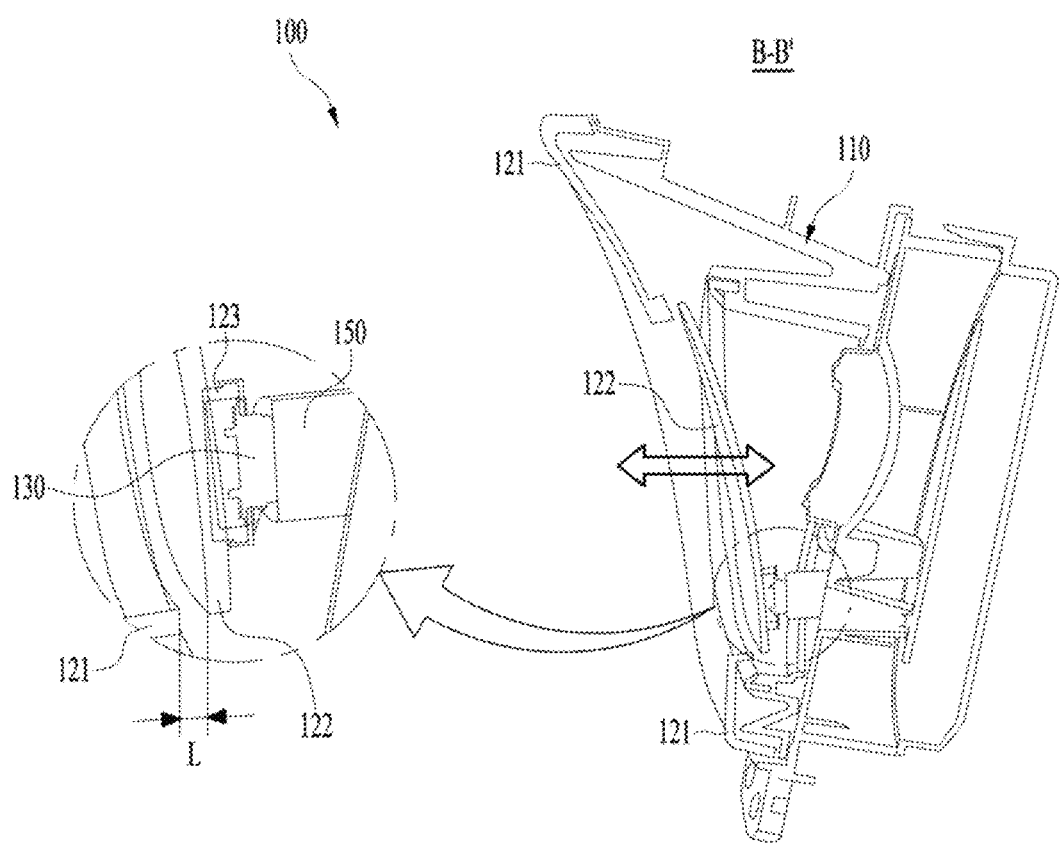
FIG. 5 is a cross-sectional view taken along line B-B' illustrated in FIG. 4.

FIG. 4 is a perspective view illustrating a vehicle instrument cluster according to a second embodiment of the present invention, and FIG. 5 is a cross-sectional view taken along line B-B' illustrated in FIG. 4;

Referring to FIGS. 4 and 5, a vehicle instrument cluster 100 includes a frame 110, a cover glass 120, exciters 130, and a holder 150.

In this case, overlapping descriptions of the above components and the above-described components of the first embodiment will be omitted.

In the vehicle instrument cluster 100 according the second embodiment, an outer glass 121 and an inner glass 122 are separated not to be in contact with each other.

In other words, this means that the inner glass 122 on which the exciters 130 are mounted does not come into contact with the outer glass 121 when the inner glass 122 is vibrated by the exciters 130.

In this case, there is a step difference between the inner glass 122 and the outer glass 121 by a separation distance L in a front-rear direction.

In this case, it means that the separation distance L is a physical distance between the inner glass 122 and the outer glass 121 which do not come into contact with each other when the inner glass 122 vibrates.

The outer glass 121 is formed in a shape in which an end portion of an inner circumferential surface thereof is bent in the rearward direction. In this case, the end portion of the inner circumferential surface of the outer glass 121 faces an end of an outer circumferential surface of the inner glass 122.

Meanwhile, the exciters 130 are disposed at three or more points on a rear surface of the inner glass 122 to maximize a function of the inner glass 122 as a speaker diaphragm. In this case, the holder 150 is disposed in the frame 110 to support the exciters 130.

Third Embodiment (Holder Structure Supporting Center of Inner Glass)

Figure 6:
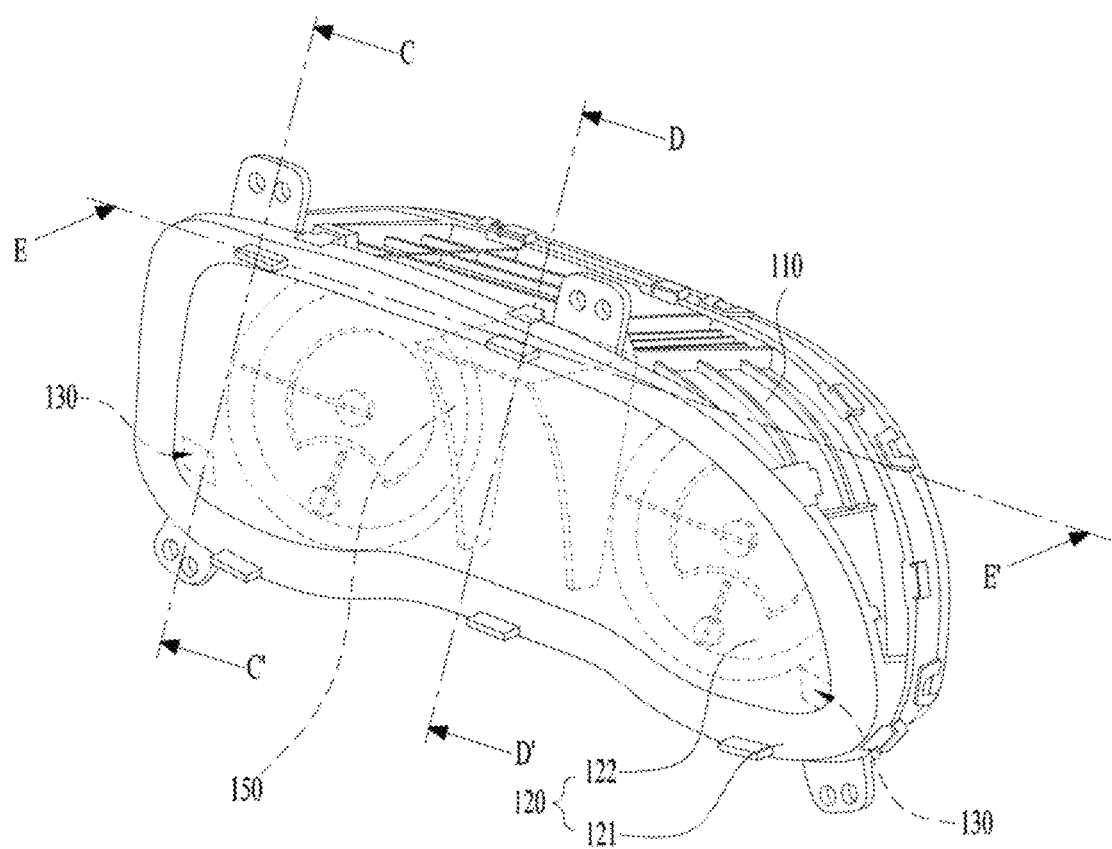
FIG. 6 is a perspective view illustrating a vehicle instrument cluster according to a third embodiment of the present invention.
Figure 7:
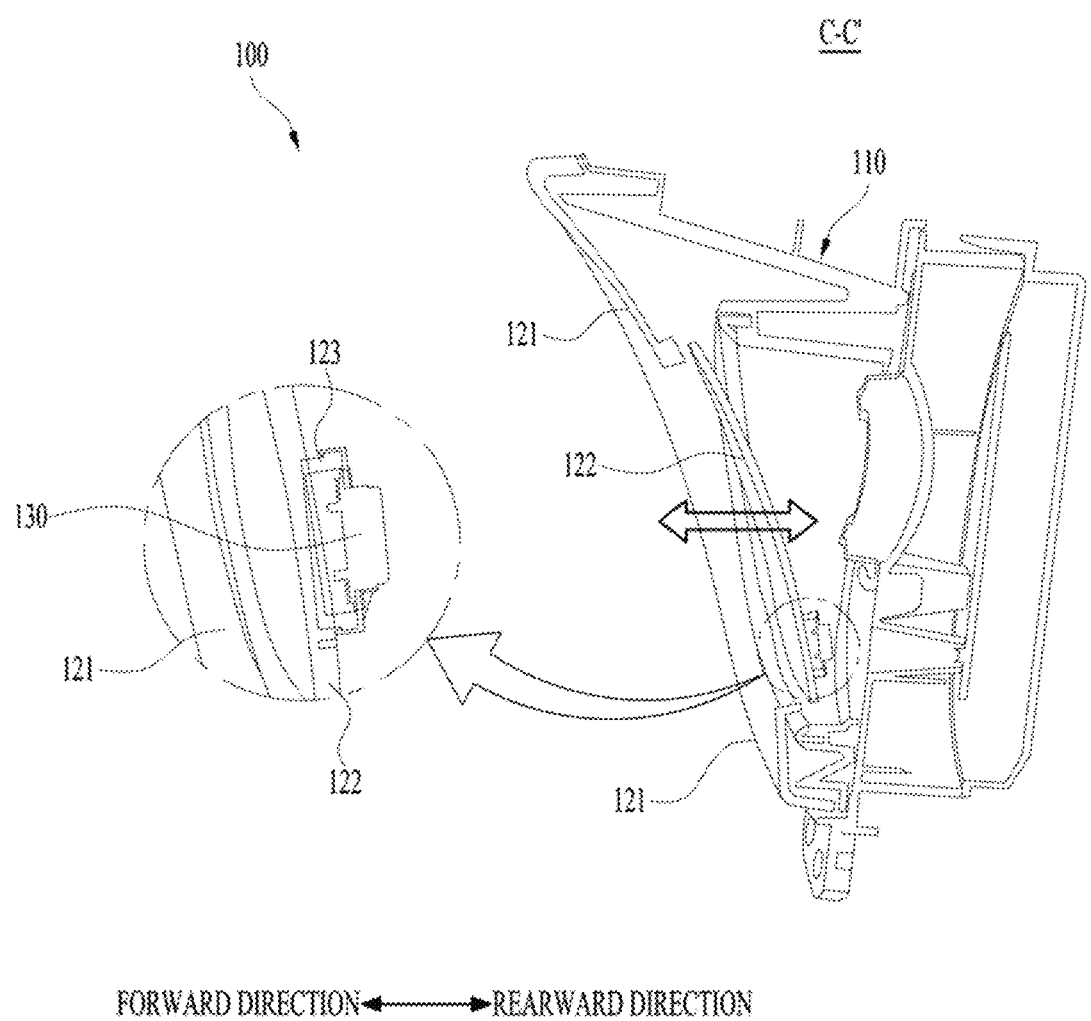
FIG. 7 is a cross-sectional view taken along line C-C' illustrated in FIG. 6.
Figure 8:
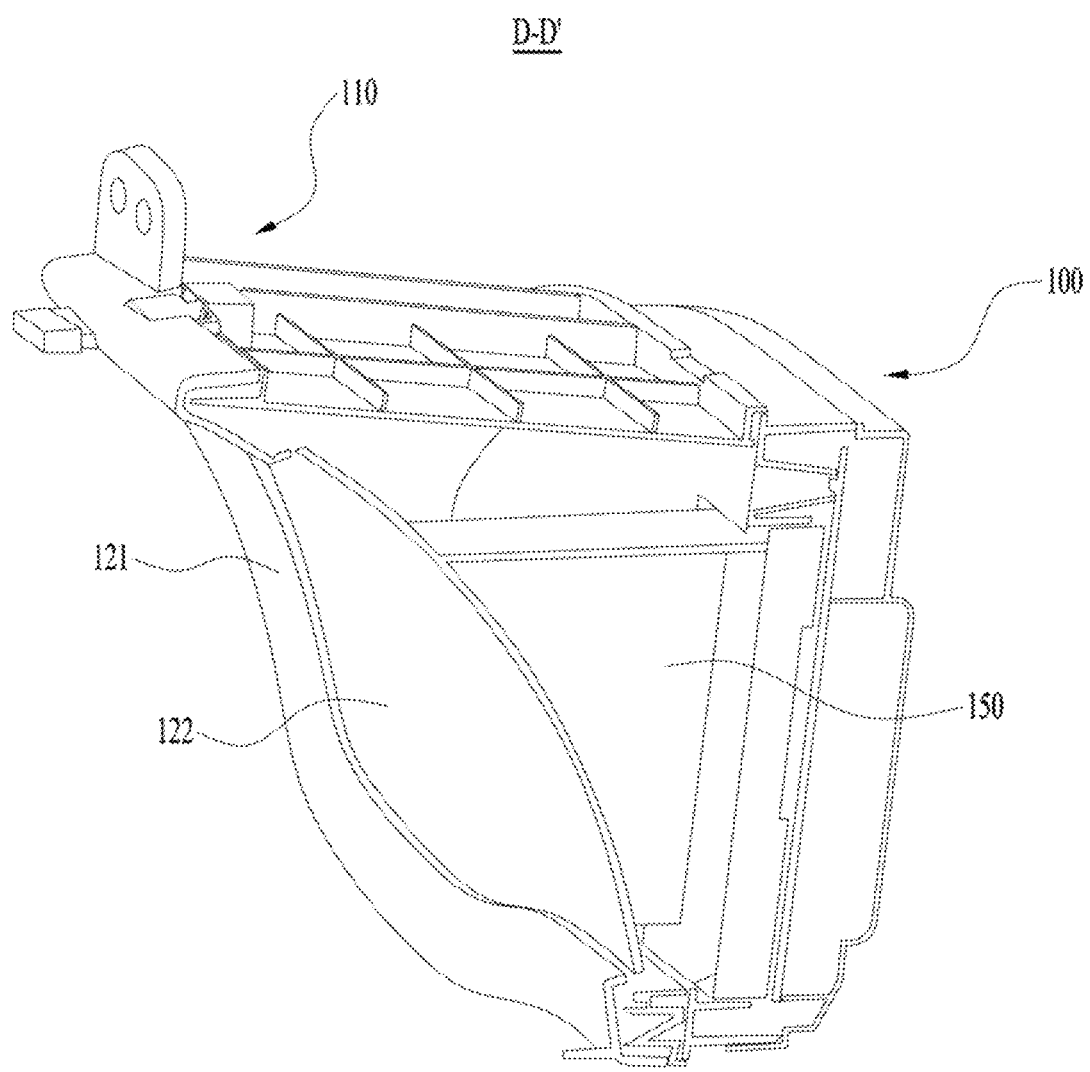
FIG. 8 is a cross-sectional view taken along line D-D' illustrated in FIG. 6.
Figure 9:
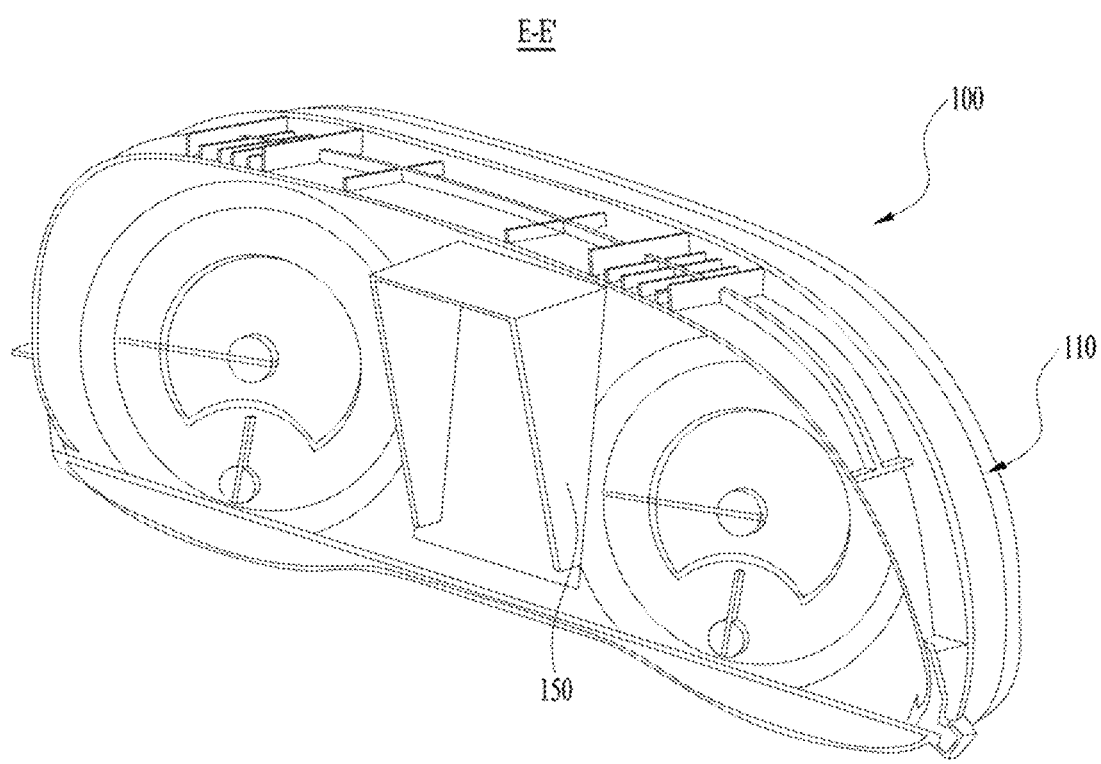
FIG. 9 is a cross-sectional view taken along line E-E' illustrated in FIG. 6.

FIG. 6 is a perspective view illustrating a vehicle instrument cluster according to a third embodiment of the present invention, and FIGS. 7 to 9 are cross-sectional views taken along lines C-C', D-D', and E-E' illustrated in FIG. 6.

Referring to FIGS. 6 to 9, a vehicle instrument cluster 100 includes a frame 110, a cover glass 120, exciters 130, and a holder 150.

In the vehicle instrument cluster 100 according to the third embodiment, an outer glass 121 and an inner glass 122 are separated as in the second embodiment.

However, in the third embodiment, the holder 150 supporting the inner glass 122 is disposed at a center of an inner portion of the frame 110.

In other words, the holder 150 according to the second embodiment has a form supporting the exciter 130, and the holder 150 according to the third embodiment has a form supporting the inner glass 122.

In this case, the holder 150 surrounds a display (not shown) included in a central portion of the frame 110, and a portion, which is in contact with the inner glass 122, of the holder 150 is formed in a curved surface shape.

The inner glass 122 may be formed to have a structure detachable from the holder 150.

In a fourth embodiment and a fifth embodiment, when an exciter is mounted on a rear surface of a cover glass fixed to a connecting portion (mount portion) of a frame, vibration of the cover glass which vibrates due to the exciter is reduced due to the connecting portion.

Accordingly, due to a lack of air vibration causing sound generation, there is a problem in the performance of a speaker as a result of the lack. To this end, a vehicle instrument cluster of the present invention proposes a structure in which the cover glass separate from the frame is used as a speaker diaphragm through the fourth and fifth embodiments which will be described below.

Meanwhile, a forward direction described in the fourth and the fifth embodiment refers to a rear side of a vehicle and a rearward direction refers to a front side of the vehicle.

That is, the forward direction of the instrument cluster (panel) faces a driver when the driver views the front but refers to the rear side of the vehicle due to facing a trunk of the vehicle. Since the rearward direction of the instrument cluster faces a bonnet of the vehicle, the rearward direction thereof refers to the front side of the vehicle.

Fourth Embodiment (Installation Structure of Elastic Member (Vibration-Proof Rubber) on Cover Glass)

Figure 10:
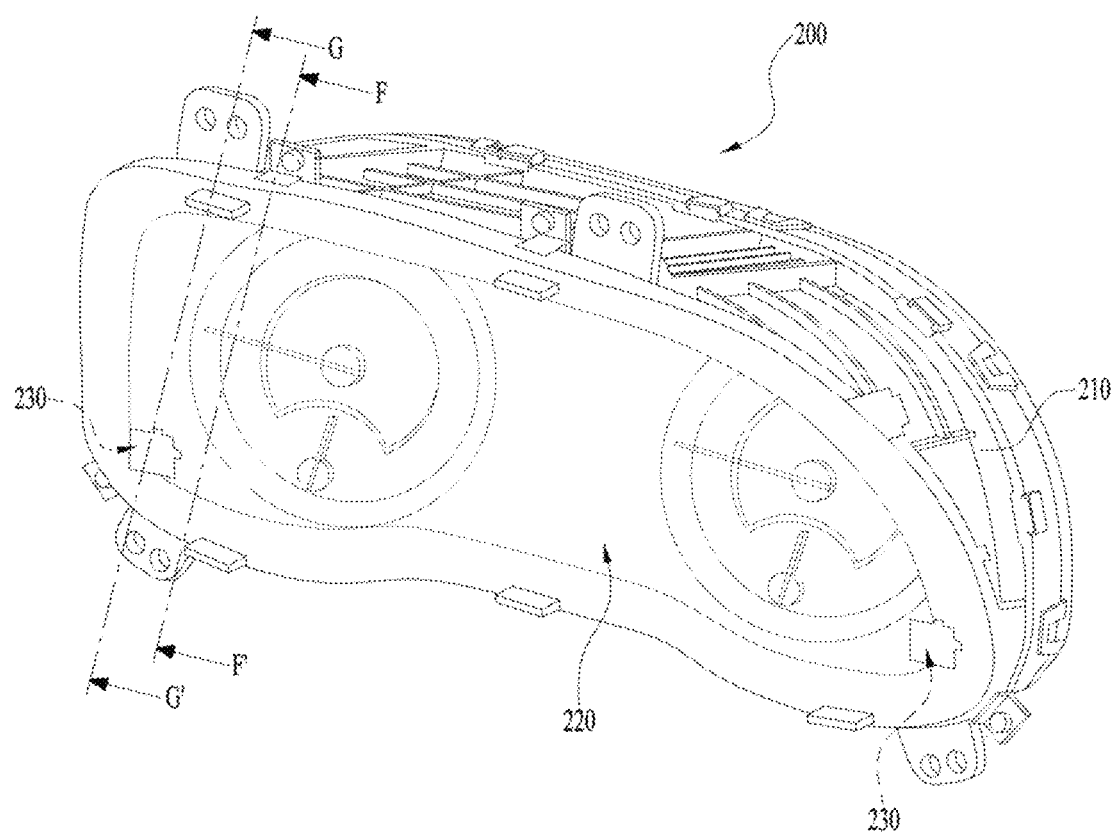
FIG. 10 is a perspective view illustrating a vehicle instrument cluster according to a fourth embodiment of the present invention.
Figure 11:
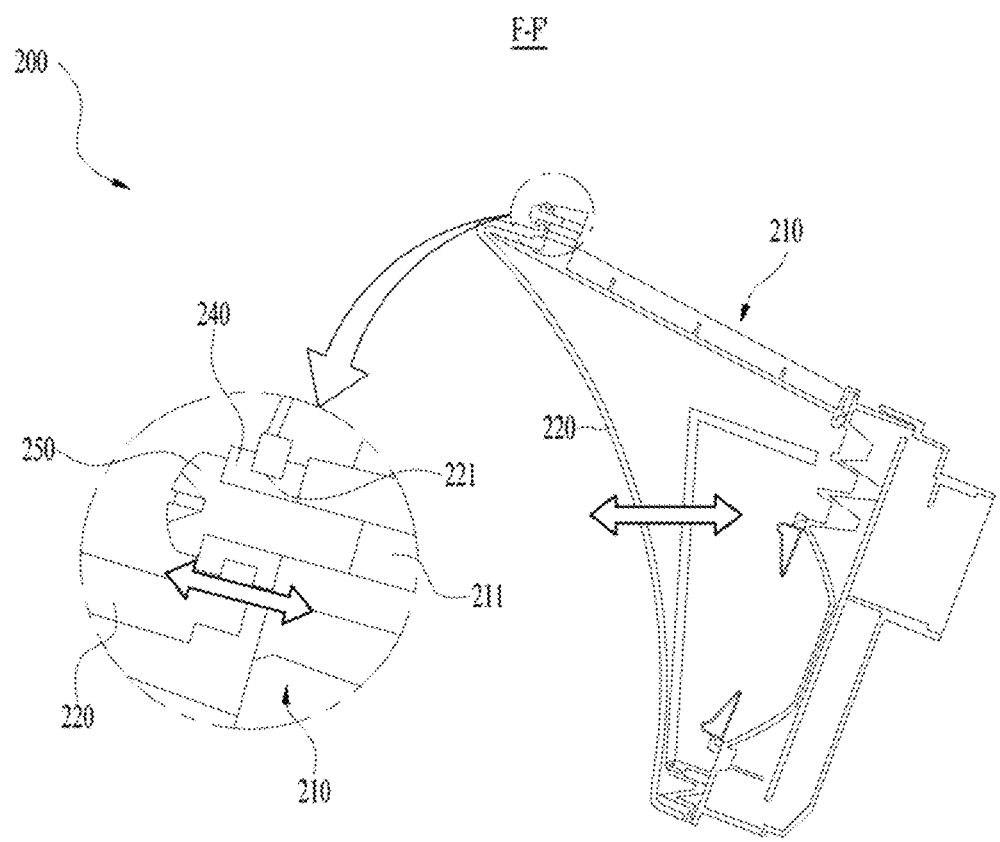
FIG. 11 is a cross-sectional view taken along line F-F' illustrated in FIG. 10.

FIG. 10 is a perspective view illustrating the vehicle instrument cluster according to the fourth embodiment of the present invention, and FIG. 11 is a cross-sectional view taken along line F-F' illustrated in FIG. 10.

Referring to FIGS. 10 and 11, a vehicle instrument cluster 200 includes a frame 210, a cover glass 220, exciters 230, an elastic member 240, and a connecting member 250.

The frame 210 is a frame that accommodates components configured to display vehicle operation information therein and has an open front surface. In this case, the vehicle operation information may refer to information indicating a vehicle speed, revolutions per minute (RPM), a temperature of cooling water, an amount of fuel, and the like.

Basically, the cover glass 220 has a form surrounding the front surface of the frame 210 and performs a speaker diaphragm function.

To this end, the cover glass 220 is connected to the frame 210 in a state in which the cover glass 220 is spaced apart from the frame 210. In this case, a cover glass mount portion 221 formed on an end portion of the cover glass 220 faces a frame mount portion 211 formed on the front surface of the frame 210. Here, the frame mount portion 211 is provided to have a hole structure in which a thread is formed on an inner circumferential surface thereof.

The exciter 230 is disposed on a rear surface of the cover glass 220. The exciter 230 has a function of vibrating the cover glass 220.

The elastic member 240 is disposed between the frame 210 and the cover glass 220. The elastic member 240 is insertion-coupled to the mount portion 221 of the cover glass 220 in a state in which the elastic member 240 passes through the mount portion 221.

In other words, the elastic member 240 passes through an inner circumferential surface of the cover glass mount portion 221 having a hollow shape and is insertion-coupled to the cover glass mount portion 221 in a form surrounding upper and lower ends of the cover glass mount portion 221.

The elastic member 240 may be formed of vibration-proof rubber capable of removing a disturbance of a frequency greater than or equal to a specific frequency.

Here, the disturbance of a frequency greater than or equal to a specific frequency may refer to an internal reflected sound which may be generated due to an interaction between the frame 210 and the cover glass 220. Detailed contents thereof will be described with reference to the accompanying drawings below.

The connecting member 250 connects the frame 210 to the cover glass 220 so that the elastic member 240 may be compressed by a predetermined displacement between the frame 210 and the cover glass 220.

Here, the predetermined displacement refers to an extent (range) to which the elastic member 240 is displaced due to vibration of the cover glass 220 such that vibration energy of the cover glass 220 which vibrates due to the exciter 230 is not transferred to the frame 210.

That is, the elastic member 240 should be displaceable to conserve the energy even when the cover glass 220 vibrates.

Accordingly, the connecting member 250 may connect the cover glass 220 and the frame 210 in the range in which the elastic member 240 is displaceable.

In this case, the connecting member 250 may be a shoulder screw.

Figure 12:
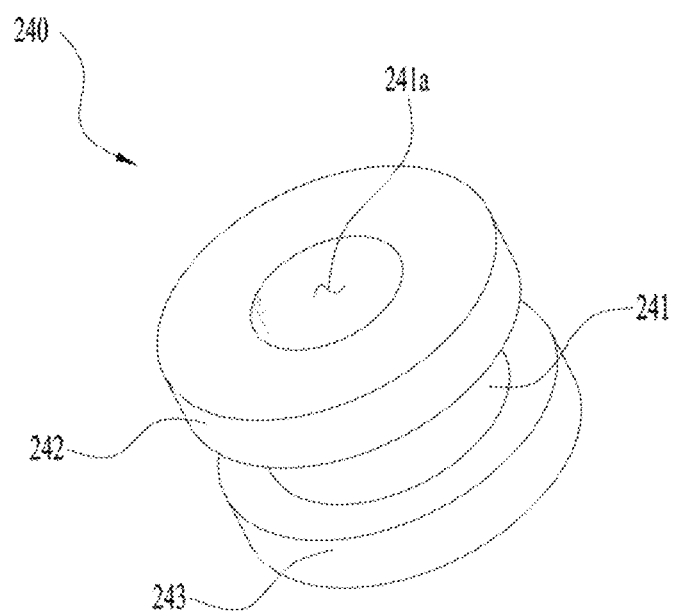
FIG. 12 is a schematic perspective view illustrating an elastic member in the vehicle instrument cluster according to the fourth embodiment of the present invention.

FIG. 12 is a schematic perspective view illustrating the elastic member in the vehicle instrument cluster according to the fourth embodiment of the present invention.

Referring to FIG. 12, the elastic member 240 includes a web shaft 241, an upper flange 242, and a lower flange 243.

The web shaft 241 passes through and is inserted into the mount portion 221 (see FIG. 11) of the cover glass 220 (see FIGS. 10 and 11) and is formed in a hollow shape. That is, the web shaft 241 includes an insertion hole 241a in a central portion thereof.

The upper flange 242 is formed to protrude outward from an upper end of the web shaft 241. The upper flange 242 is disposed between the connecting member 250 (see FIG. 11) and the cover glass 220 (see FIGS. 10 and 11).

The lower flange 243 is formed to protrude outward from a lower end of the web shaft 241. The lower flange 243 is disposed between the cover glass 220 (see FIGS. 10 and 11) and the frame 210 (see FIGS. 10 and 12).

Figure 13:
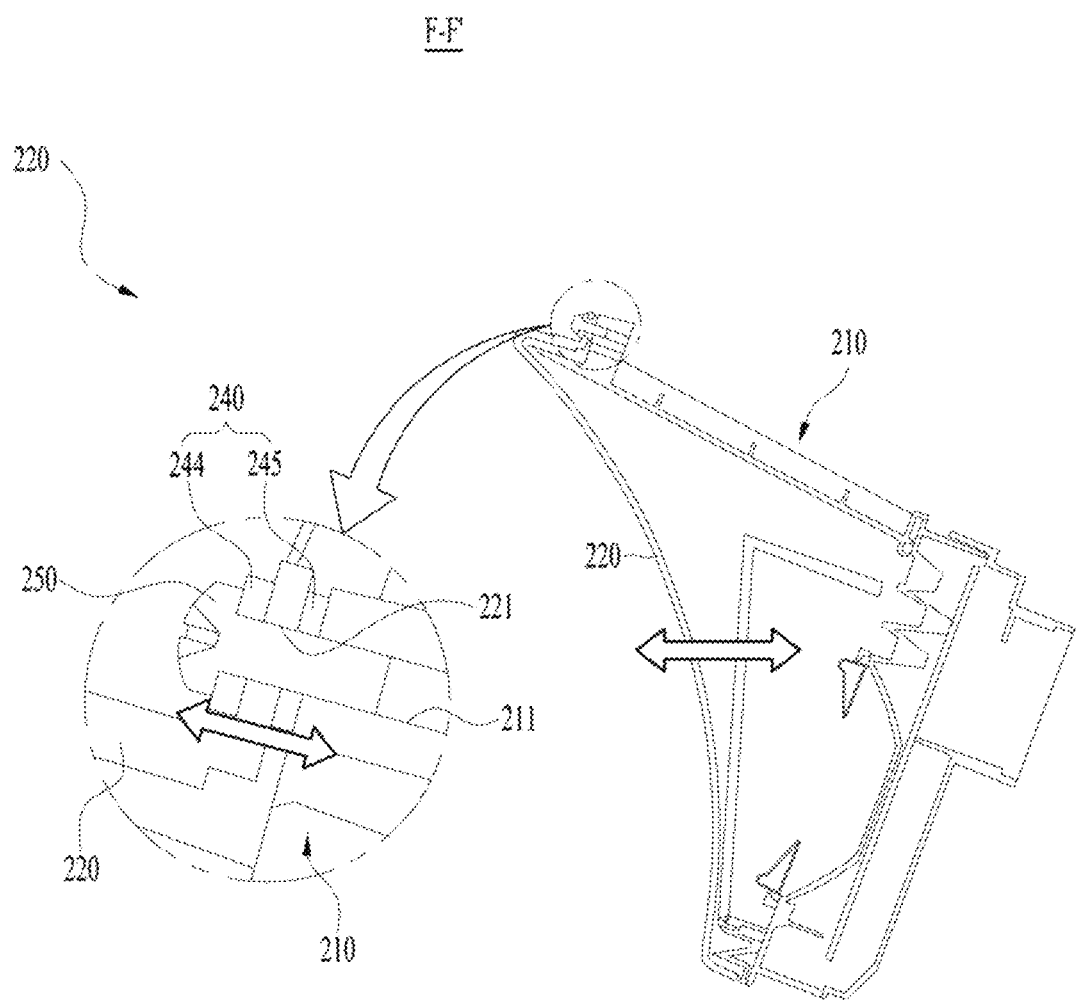
FIG. 13 is a view illustrating modified examples of the elastic member and a cover glass in the vehicle instrument cluster according to the fourth embodiment of the present invention.

FIG. 13 is a view illustrating a modified example of the elastic member and the cover glass in the vehicle instrument cluster according to the fourth embodiment of the present invention.

Referring to FIG. 13, an elastic member 240 includes an upper end pad 244 and a lower end pad 245.

The upper end pad 244 is disposed between a connecting member 250 and a cover glass 220.

The lower end pad 245 is disposed between the cover glass 220 and a frame 210.

As described above, in the modified example illustrated in FIG. 13, a shape of an elastic member 240 is not integrally formed like in the fourth embodiment, and the elastic member 240 has a shape divided into an upper portion and a lower portion with the cover glass 220 interposed therebetween.

In the fourth embodiment, in the state in which the elastic member 240 passes through the cover glass mount portion 221, the connecting member 250 passes through and is inserted into the insertion hole 241a (see FIG. 12) of the elastic member 240.

On the other hand, in the modified example of the fourth embodiment, since the elastic member 240 does not pass through a cover glass mount portion 221, the connecting member 250 directly passes through and is inserted into the cover glass mount portion 221.

Such a modified example is different from the fourth embodiment in the range in which the connecting member 250 shakes due to vibration.

In other words, in the fourth embodiment of the present invention, since the connecting member 250 is inserted into the elastic member 240, the cover glass 220 has a high possibility of shaking in front-rear and up-down directions.

The connecting member 250 passes through the cover glass 220 and is fixedly inserted into the mount portion 211 of the frame 210 so that the elastic member 240 may be compressed by a predetermined displacement.

That is, in the modified example, since the connecting member 250 is directly inserted into the cover glass mount portion 221, the cover glass 120 vibrates only in front-rear direction even when receiving the vibration.

In this case, the key point is that the elastic member 240 blocks vibration energy of the cover glass 220, which vibrates due to the exciter 230 (see FIG. 10), from being transferred to the frame 210.

Figure 14:
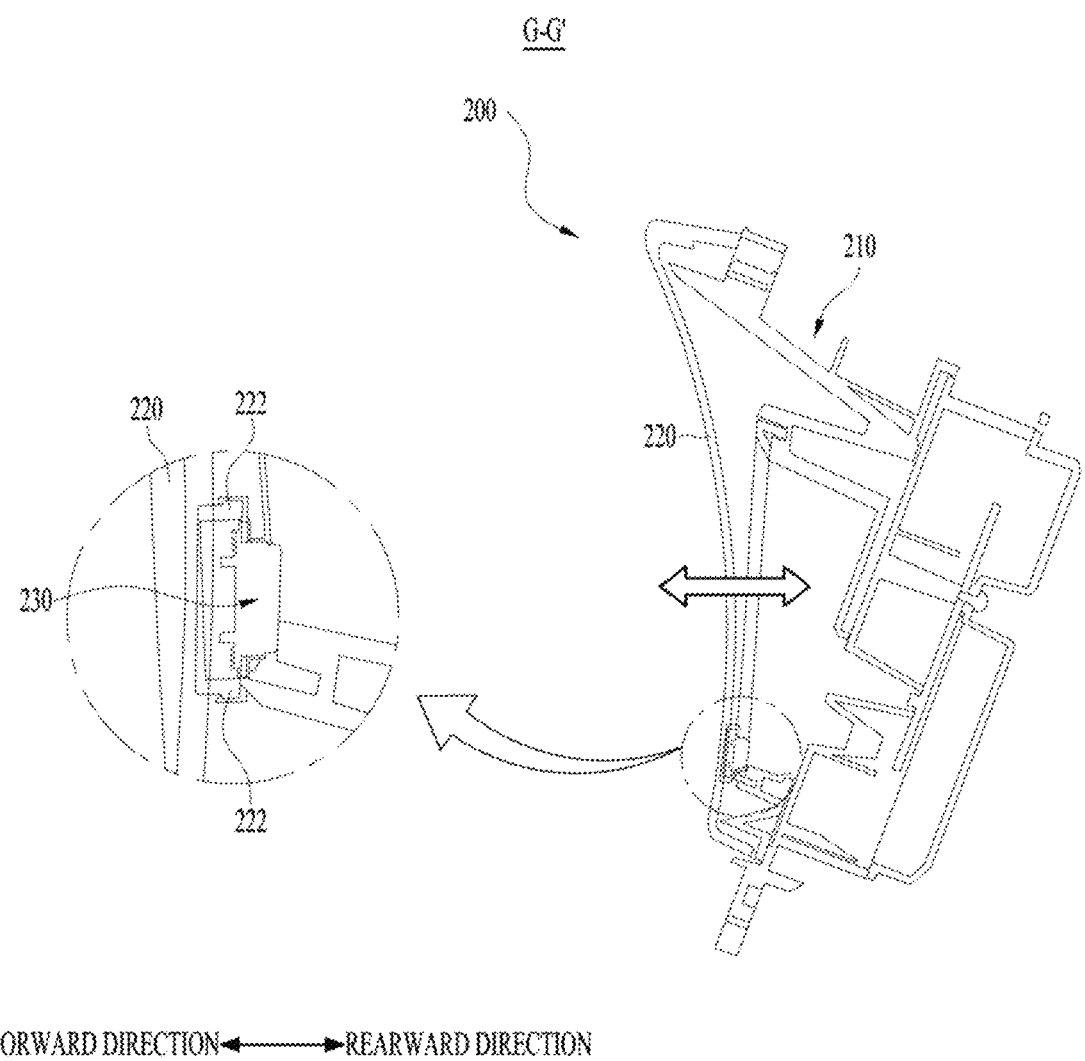
FIG. 14 is a cross-sectional view taken along line G-G' illustrated in FIG. 10.
Figure 15:
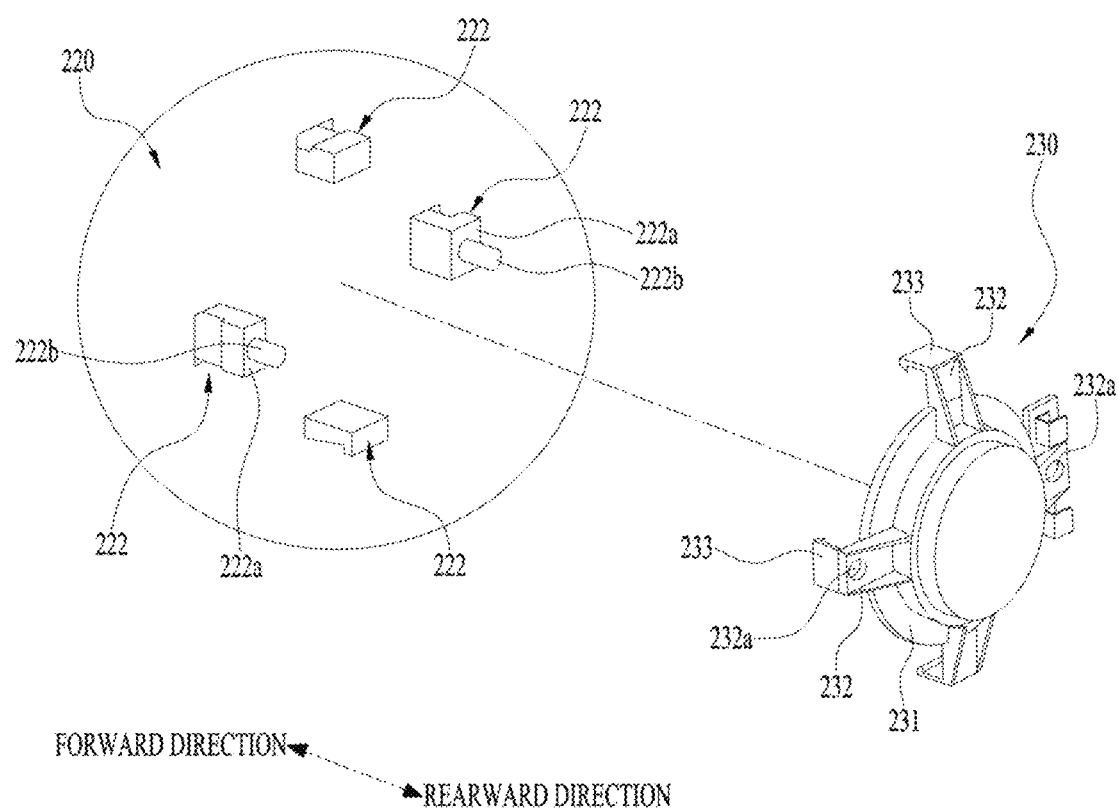
FIG. 15 is a view illustrating a coupling relationship between an exciter and the cover glass in the vehicle instrument cluster according to the embodiment of the present invention.

FIG. 14 is a cross-sectional view taken along line G-G' illustrated in FIG. 10, and FIG. 15 is a view illustrating a coupling relationship between the exciter and the cover glass in the vehicle instrument cluster according to the embodiment of the present invention.

Referring to FIGS. 14 and 15, the exciter 230 is an apparatus configured to supply an excitation current and is also referred to as an exciter. The exciter 230 vibrates the cover glass 220 using a signal current flowing in a voice coil.

To this end, the exciter 230 is disposed on the rear surface of the cover glass 220 and vibrates the cover glass 220 in the front-rear direction.

The exciters 230 are disposed on both ends of the rear surface of the cover glass 220 so that the cover glass 220 has a stereo effect as a speaker diaphragm.

In this case, the exciters 230 may also be disposed at three or more positions on the rear surface of the cover glass 220 at intervals.

The exciter 230 is coupled to the cover glass 220 through a snap-fit coupling method. That is, the exciter 230 and the cover glass 220 are detachably press-fitted to each other.

The exciter 230 includes a housing 231, brackets 232, and coupling hooks 233.

The housing 231 accommodates a voice coil and a magnet therein.

The plurality of brackets 232 are formed on an outer circumferential surface of the housing 231. In this case, the plurality of brackets 232 are formed at equidistant intervals along the outer circumferential surface of the housing 231. In addition, one or more coupling holes 232a are formed in the plurality of brackets 232.

In this case, it is more appropriate that the plurality of coupling holes 232a are not formed in the bracket 232, but the plurality of coupling holes 232a may or may not be formed in the bracket 232 according to a position of the bracket 232.

The coupling hook 233 is formed to be bent and extend in a forward direction of the bracket 232. The coupling hook 233 is press-fitted to the rear surface of the cover glass 220.

In this case, a plurality of coupling protrusions 222 engaged with and press-fitted to the coupling hooks 233 are formed on the rear surface of the cover glass 220.

The coupling protrusions 222 include seating surfaces 222a and coupling rods 222b.

The seating surface 222a is in surface contact with the bracket 232.

The coupling rod 222b is formed to protrude in a rearward direction from the seating surface 222a. The coupling rod 222b passes through the coupling hole 132a of the exciter 230.

Figure 16:
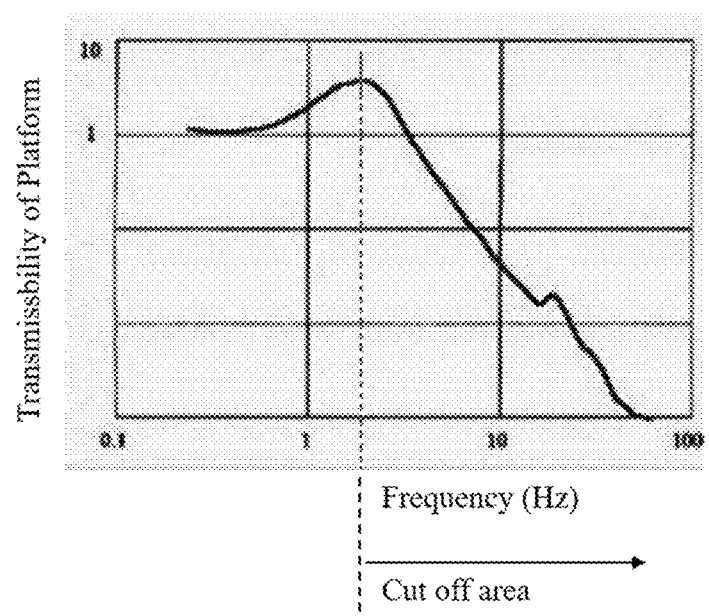
FIG. 16 is a graph showing a cut-off characteristic of the elastic member, which removes a disturbance of a frequency greater than or equal to a specific frequency, in the vehicle instrument cluster according to the fourth embodiment of the present invention.

FIG. 16 is a graph showing a cut-off characteristic of the elastic member, which removes a disturbance of a frequency greater than or equal to a specific frequency, in the vehicle instrument cluster according to the fourth embodiment of the present invention;

When describing FIG. 16, in order to facilitate understanding of the corresponding graph, FIG. 16 will be described with reference to FIGS. 10 to 15 (reference numerals) which have been described above.

Referring to FIG. 16, a data value which denotes a property of the elastic member 240 in a state in which the cover glass 220 on which the exciter 230 is mounted is isolated by the elastic member 240 may be seen.

That is, a feature of the elastic member 240 is to remove a disturbance (internal reflected sound) of a frequency greater than or equal to a specific frequency. Due to the elastic member 240, internal reflected energy of the cover glass 120 is reduced.

Generally, due to an interaction between a support surface (frame 210) and a speaker bottom (cover glass 220), speaker energy may be internally reflected so that a sound distortion may occur.

A speaker generates vibration and stimulates the support surface which generates an unnatural sound. In addition, a situation may occur in which energy resonates and is transferred to other spaces through the support surface, or the speaker stimulates other objects within a listening area.

In this case, the internal reflected sound may cause a decrease in sound clearness, or the sound may be three-dimensionally and widely spread. As a result, the internal reflected sound causes a sound distortion to lose the sound clearness and openness.

However, in the elastic member 240 of the present invention, since the cover glass 220 is isolated through a double structure to solve the above-described problem, a disturbance of a frequency greater than or equal to a specific frequency is removed so that the internal reflected energy of the cover glass 220 can be reduced.

Fifth Embodiment (Installation Structure of Magnet Bearing on Cover Glass)

Figure 17:
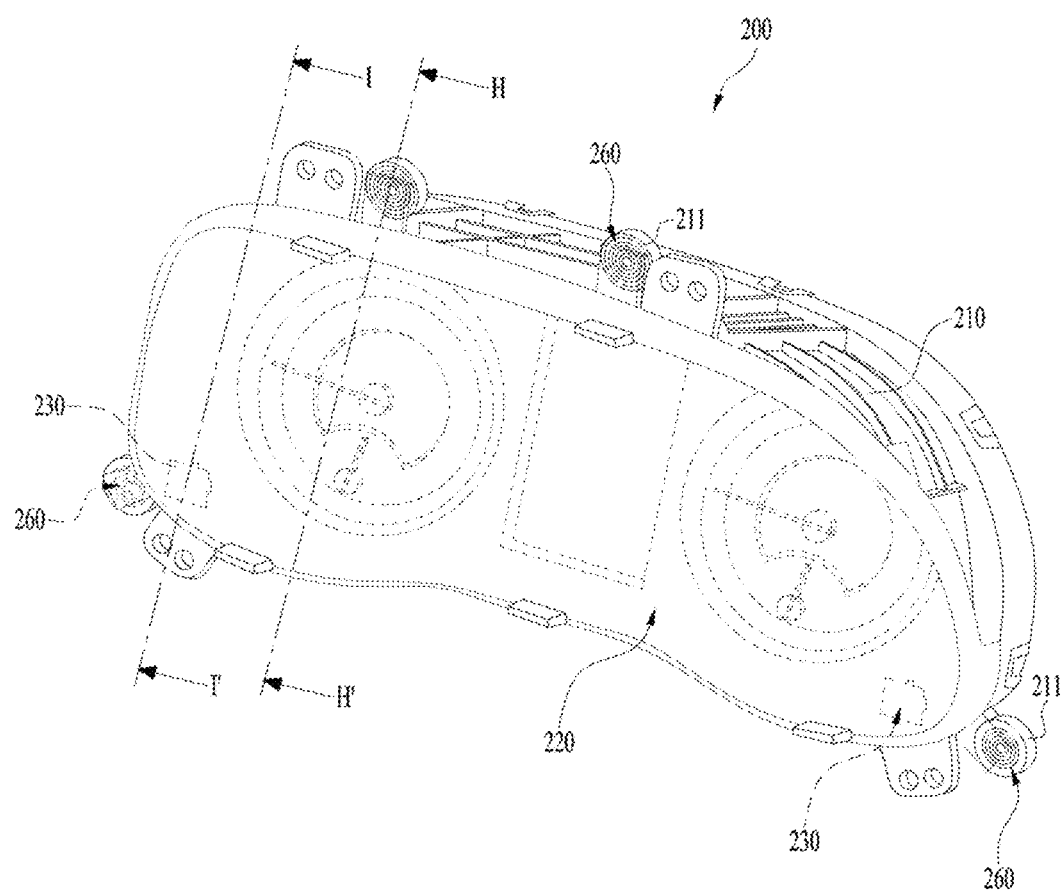
FIG. 17 is a perspective view illustrating a vehicle instrument cluster according to a fifth embodiment of the present invention.
Figure 18:
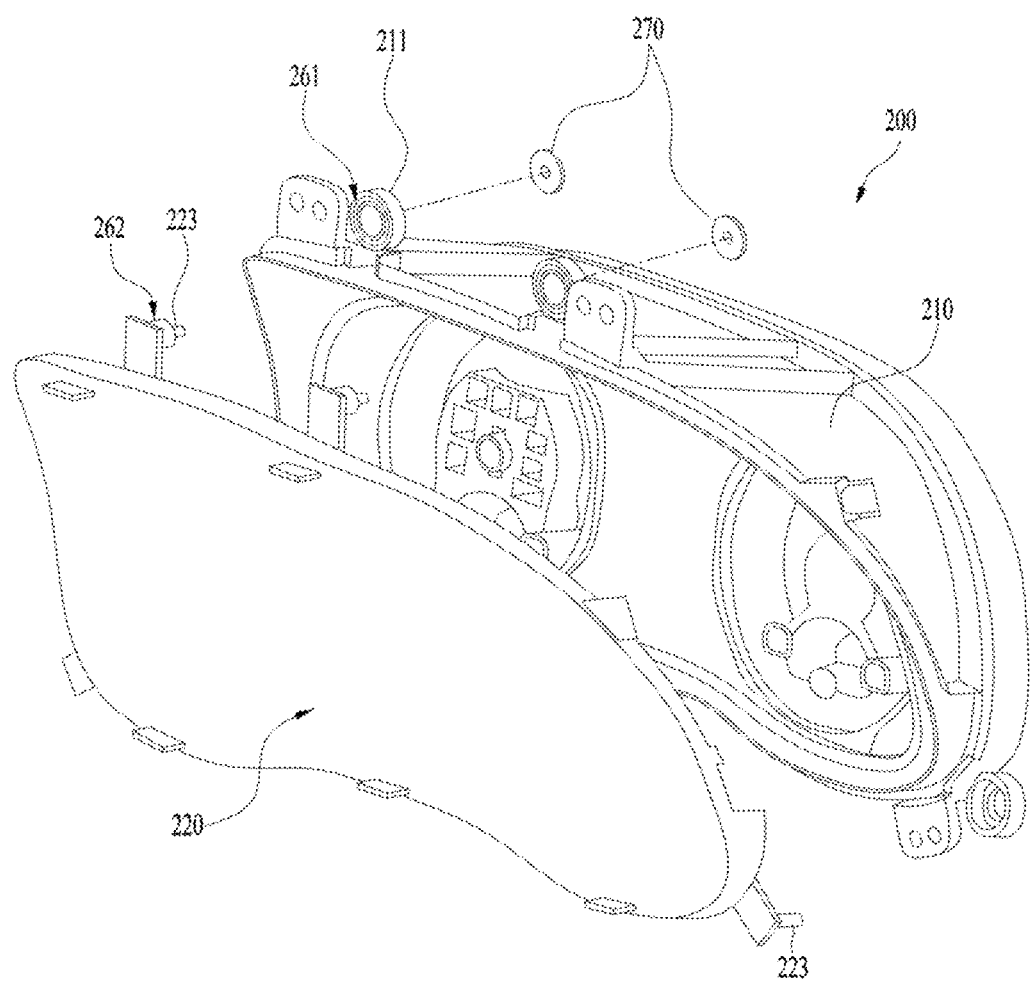
FIG. 18 is an exploded perspective view illustrating the vehicle instrument cluster according to the fifth embodiment of the present invention.
Figure 19:
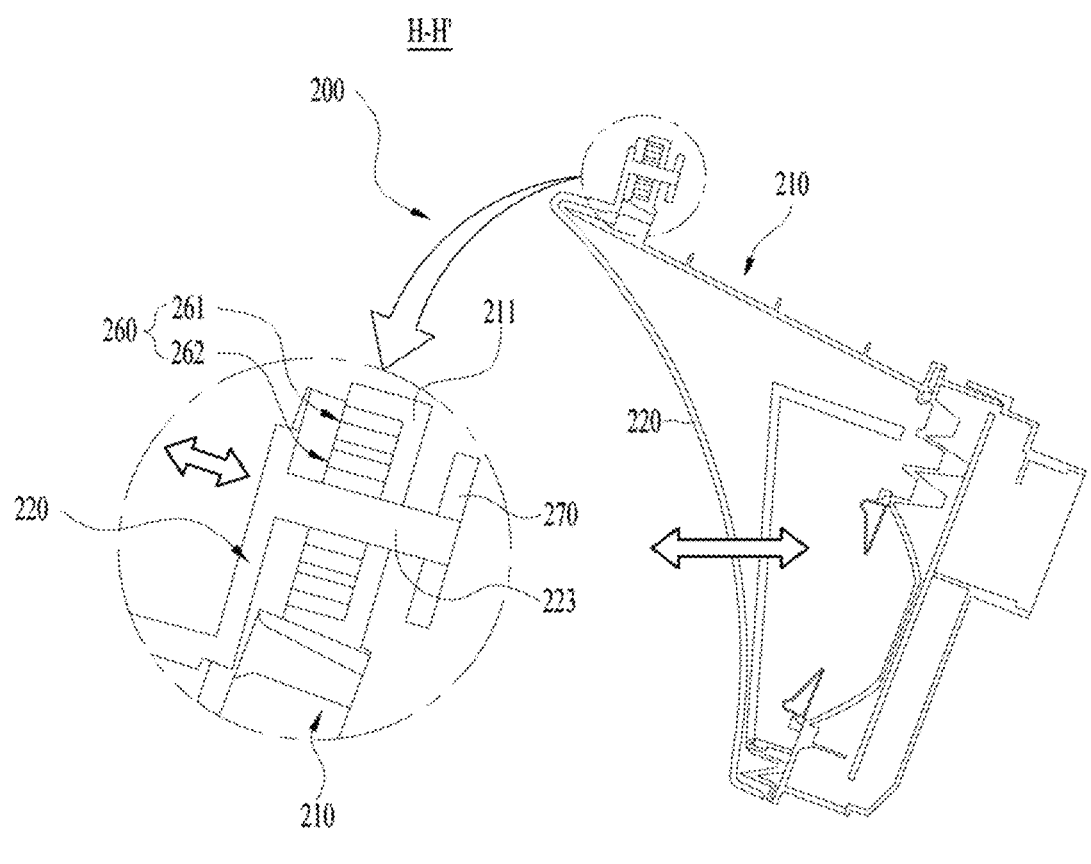
FIG. 19 is a cross-sectional view taken along line H-H' illustrated in FIG. 17.

FIG. 17 is a perspective view illustrating a vehicle instrument cluster according to a fifth embodiment of the present invention, FIG. 18 is an exploded perspective view illustrating the vehicle instrument cluster according to the fifth embodiment of the present invention, and FIG. 19 is a cross-sectional view taken along line H-H' illustrated in FIG. 17.

Referring to FIGS. 17 to 19, a vehicle instrument cluster 200 mainly includes a frame 210, a magnet bearing 260, a cover glass 220, and a limiter 270.

In this case, among the above components, contents overlapping those of the fourth embodiment will be omitted.

The frame 210 has an accommodation space of which a front surface is open and includes a plurality of coupling pieces 212 formed on an end portion of an outer side thereof. In this case, the coupling piece 212 is formed to have a hollow shape and have a structure in which a portion of an end portion of a rear surface is bent.

The magnet bearing 260 includes an outer magnet 261 and an inner magnet 262.

The outer magnet 261 is mounted on the coupling piece 212. In this case, the coupling piece 212 surrounds a rear surface of the outer magnet 261 to prevent the outer magnet 261 from being separated to the outside.

In this case, the outer magnet 261 is formed of N and S poles which are vertically and alternately disposed and is formed in a hollow shape of which an interior is empty.

The inner magnet 262 is disposed inside the outer magnet 261 in a state in which the inner magnet 262 is spaced apart from the outer magnet 261.

In this case, the inner magnet 262 is also formed of N and S poles which are vertically and alternately disposed like the outer magnet 261, and the outer magnet 261 and the inner magnet 262 are disposed so that different poles are alternately disposed to generate an attractive force between the outer magnet 261 and the inner magnet 262.

The inner magnet 262 is fixed to a fixed shaft 223 of the cover glass 220. In this case, the fixed shaft 223 is fixed in a state of being inserted into the inner magnet 262.

A non-contact state between the inner magnet 262 and the outer magnet 261 is maintained due to a magnetic force to protect vibration energy of the cover glass 220 which vibrates due to exciters 230 from being transferred to the outer magnet 261.

The limiter 270 is connected to the fixed shaft 223 of the cover glass 220 to prevent the cover glass 220 from being separated from the coupling piece 212.

To this end, the limiter 270 may have a width greater than a diameter of an inner circumferential surface of the outer magnet 261.

In this case, the limiter 270 may be formed of an impact relief material such as a synthetic rubber so as to relieve an external impact.

Figure 20:
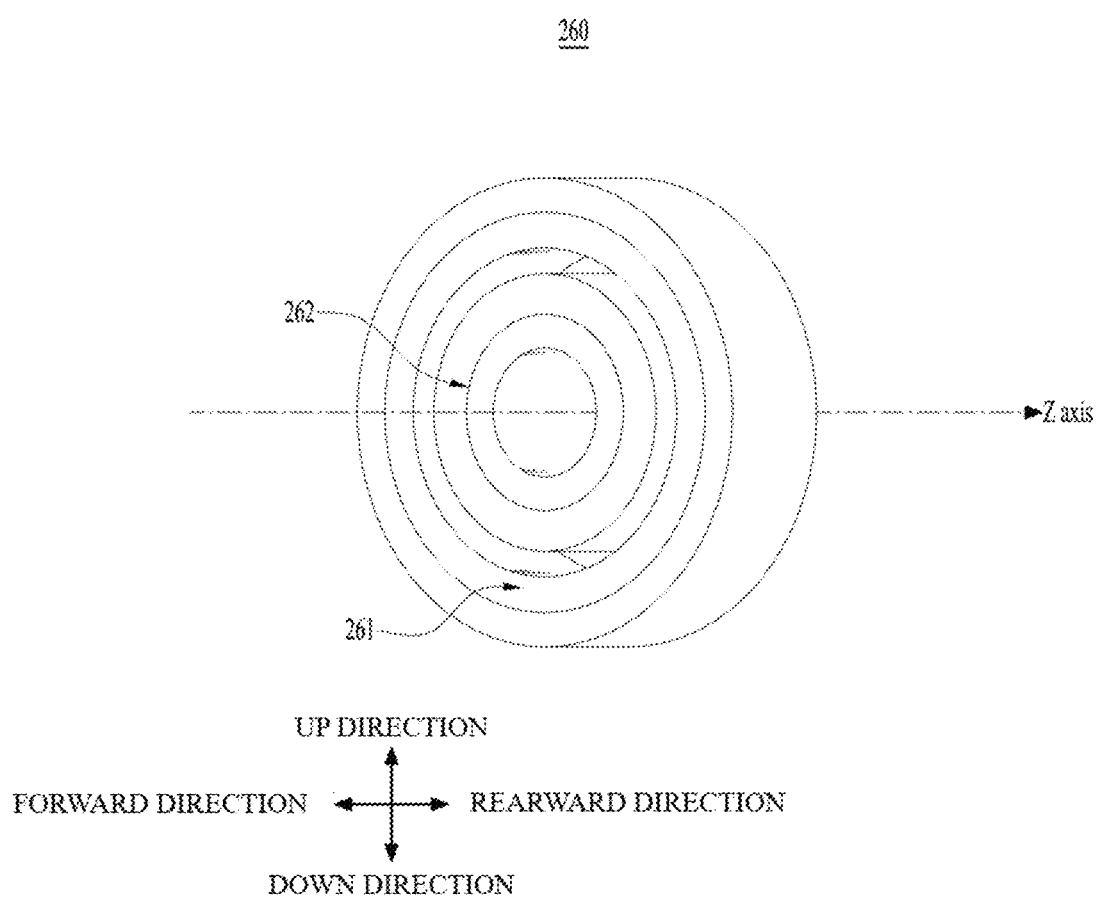
FIG. 20 is a schematic perspective view illustrating a magnet bearing in the vehicle instrument cluster according to the fifth embodiment of the present invention.
Figure 21:
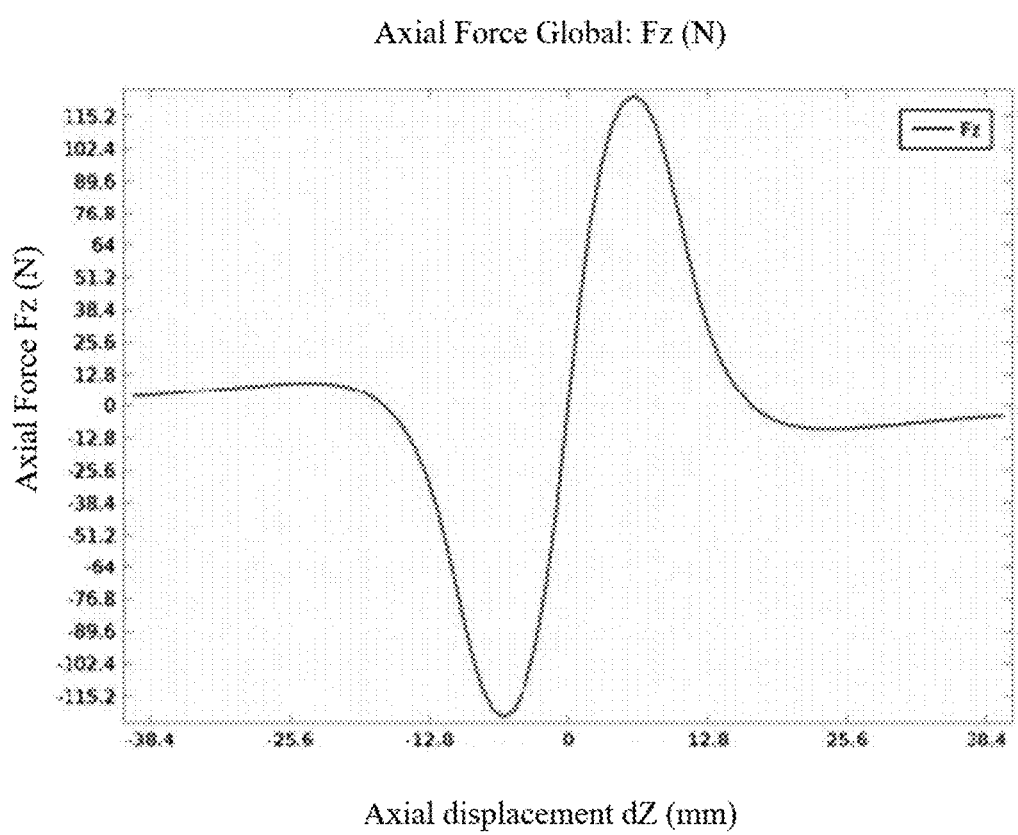
FIG. 21 and FIG. 22 are graphs showing result values according to a change in position of an inner magnet in the magnet bearing of FIG. 20.
Figure 22:
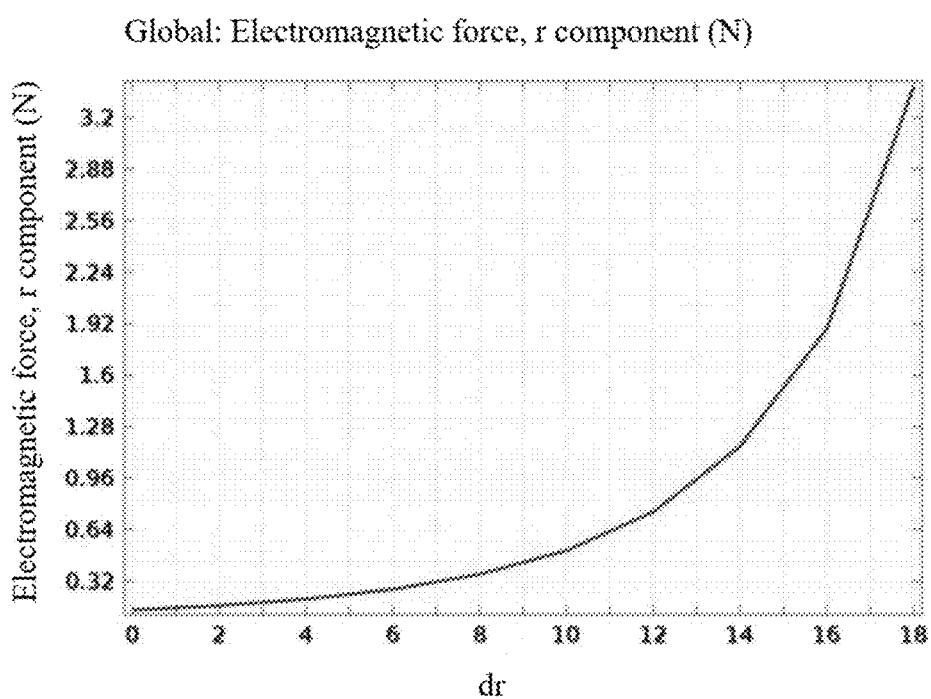

FIG. 20 is a schematic perspective view illustrating the magnet bearing in the vehicle instrument cluster according to the fifth embodiment of the present invention, and FIGS. 21 and 22 are graphs showing result values according to a change in position of the inner magnet in the magnet bearing of FIG. 20.

Referring to FIGS. 20 and 21, when the inner magnet 262 is moved in a front-rear direction with respect to a Z-axis, as shown in the graph of FIG. 21, an axial force is generated in a predetermined range of front-rear movement so that Fz is positioned at 0 mm.

Conversely, in FIGS. 20 and 22, when the inner magnet 262 is moved in an up-down direction, as shown in the graph of FIG. 22, a radial force is increased in a direction in which a radius thereof is increased, that is, as the inner magnet 262 is moved away from a center.

As a result, a center position of the inner magnet 262 is maintained due to the axial force and the radial force.

Figure 23:
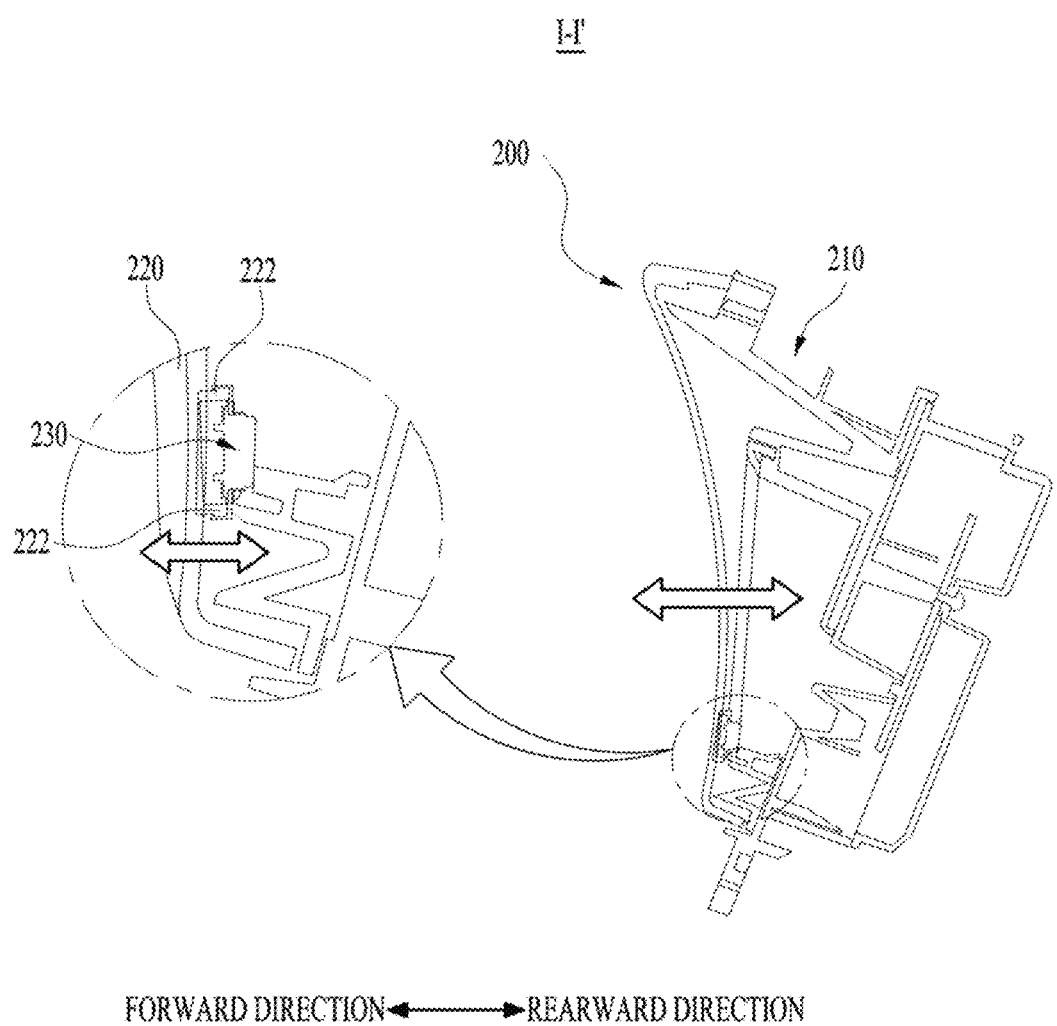
FIG. 23 is a cross-sectional view taken along line I-I' illustrated in FIG. 17.

FIG. 23 is a cross-sectional view taken along line I-I' illustrated in FIG. 17.

Referring to FIG. 23, the cover glass 220 on which one or more exciters 230 are mounted is floated in the air by the magnet bearing 260.

In this case, the exciter 230 vibrates the cover glass 220 in the front-rear direction, and vibration energy of the cover glass 220 is conserved by the magnet bearing 260.

That is, the vibration energy of the cover glass 220 which vibrates due to the exciter 230 is not transferred to the frame 210 through the magnet bearing 260.

As described above, in the present invention, after a cover glass is divided into an outer glass and an inner glass, the inner glass on which an exciter is mounted is used as a speaker diaphragm so that a direction of an image of an instrument cluster can be the same as that of a sound thereof.

Accordingly, in the present invention, a sound image can be formed in a center of a screen, and a sound field can be formed in the entire screen to greatly help a driver to recognize a situation.

In addition, according to the embodiments of the present invention, vibration attenuation of the inner glass on which the exciter is mounted is minimized due to a holder and a suspension connected to the inner glass so that the inner glass can effectively function as the speaker diaphragm.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A vehicle instrument cluster comprising:
    a frame accommodating a component configured to display vehicle operation information therein and having an open front surface;
    a cover glass including an outer glass having a hollow shape surrounding an outer edge of the front surface of the frame and an inner glass surrounding a center of the front surface of the frame, the inner glass being spaced apart from the outer glass;
    an exciter disposed on a rear surface of the inner glass and configured to vibrate the inner glass; and
    a suspension disposed between and connected to the outer glass and the inner glass spaced apart from each other, and arranged continuously around an outer circumferential surface of the inner glass.

2. The vehicle instrument cluster of claim 1, wherein the suspension has a corrugated shape and is disposed between and connected to an inner circumferential surface of the outer glass and the outer circumferential surface of the inner glass.

3. The vehicle instrument cluster of claim 1, wherein the suspension is disposed between and detachably connected to an inner circumferential surface of the outer glass and the outer circumferential surface of the inner glass.

4. The vehicle instrument cluster of claim 1, wherein the suspension:
    maintains a front-rear movement of the inner glass vibrated by the exciter; and
    blocks vibration energy of the inner glass from being transferred to the outer glass.

5. The vehicle instrument cluster of claim 1, wherein the exciter is disposed on each of both ends of the rear surface of the inner glass.

6. The vehicle instrument cluster of claim 1, wherein the exciter is coupled to the inner glass through a snap-fit coupling method.

7. The vehicle instrument cluster of claim 1, wherein the exciter includes:
    a housing including a voice coil and a magnet therein;
    a plurality of brackets formed on an outer circumferential surface of the housing; and
    coupling hooks which are bent and extended in a forward direction of the brackets and press-fitted to the rear surface of the inner glass.

8. The vehicle instrument cluster of claim 7, wherein a plurality of coupling protrusions, which are protruded and engaged with and press-fitted to the coupling hooks, are formed on the rear surface of the inner glass.

9. The vehicle instrument cluster of claim 8, wherein the coupling protrusion includes:
    a seating surface in contact with the bracket; and
    a coupling rod protruding from the seating surface in a rearward direction.

10. The vehicle instrument cluster of claim 9, wherein:
    the plurality of brackets are formed at equidistant intervals along the outer circumferential surface of the housing; and
    a coupling hole through which the coupling rod passes is formed in at least one of the brackets.

* * * * *